United States Patent [19]

Kuhnlein et al.

[11] 4,068,089
[45] Jan. 10, 1978

[54] DATA INDICATOR UNIT

[75] Inventors: Werner Kuhnlein, Oberengstringen; Heinrich Eggenberger, Dielsdorf; Heinz Walter Minet, Buchs, all of Switzerland

[73] Assignee: Gretag Aktiengesellschaft, Regensdorf, Switzerland

[21] Appl. No.: 659,252

[22] Filed: Feb. 19, 1976

[30] Foreign Application Priority Data

Feb. 24, 1975 Switzerland .......................... 2310/75
Nov. 12, 1975 Switzerland ........................ 14651/75

[51] Int. Cl.$^2$ ............................................. H04L 9/02
[52] U.S. Cl. ...................... 178/22; 340/325; 340/337
[58] Field of Search .................. 178/26 A, 22, 30; 340/337, 325

[56] References Cited

U.S. PATENT DOCUMENTS

| | | | |
|---|---|---|---|
| 2,982,818 | 5/1961 | Kendall | 178/26 A |
| 3,267,213 | 8/1966 | Berger | 178/22 |
| 3,771,156 | 11/1973 | Watts | 340/325 |
| 3,792,444 | 2/1974 | Spinner et al. | 340/325 |
| 3,877,018 | 4/1975 | Hakozaki | 340/337 |
| 3,878,331 | 4/1975 | Morgan et al. | 178/22 |
| 3,962,700 | 6/1976 | Criscimagna | 340/337 |
| 3,974,497 | 8/1976 | Ohkawa et al. | 340/337 |

*Primary Examiner*—Howard A. Birmiel
*Attorney, Agent, or Firm*—Burns, Doane, Swecker & Mathis

[57] ABSTRACT

A data indicator unit having setting keys which control a setting stage connected in series with a switching unit that controls the energization of a series of optical character indicator devices, the number of switching states of the switching unit corresponding to the number of character indicating devices. Only one key need be provided which, to enter a selected character, can be actuated a number of times to set the setting stage accordingly to energize one of the character indicating devices corresponding to the selected character. Alternatively the key can be depressed for a selected period to effect entry of a selected character or a ten key keyboard may be provided to enter selected characters by depression of one, or a pair of keys, so that, for example, thirty two characters may be indicated by operation of only ten keys. The indicator unit may incorporate a ciphering/deciphering unit to encipher the selected characters and indicate its enciphered form.

11 Claims, 5 Drawing Figures

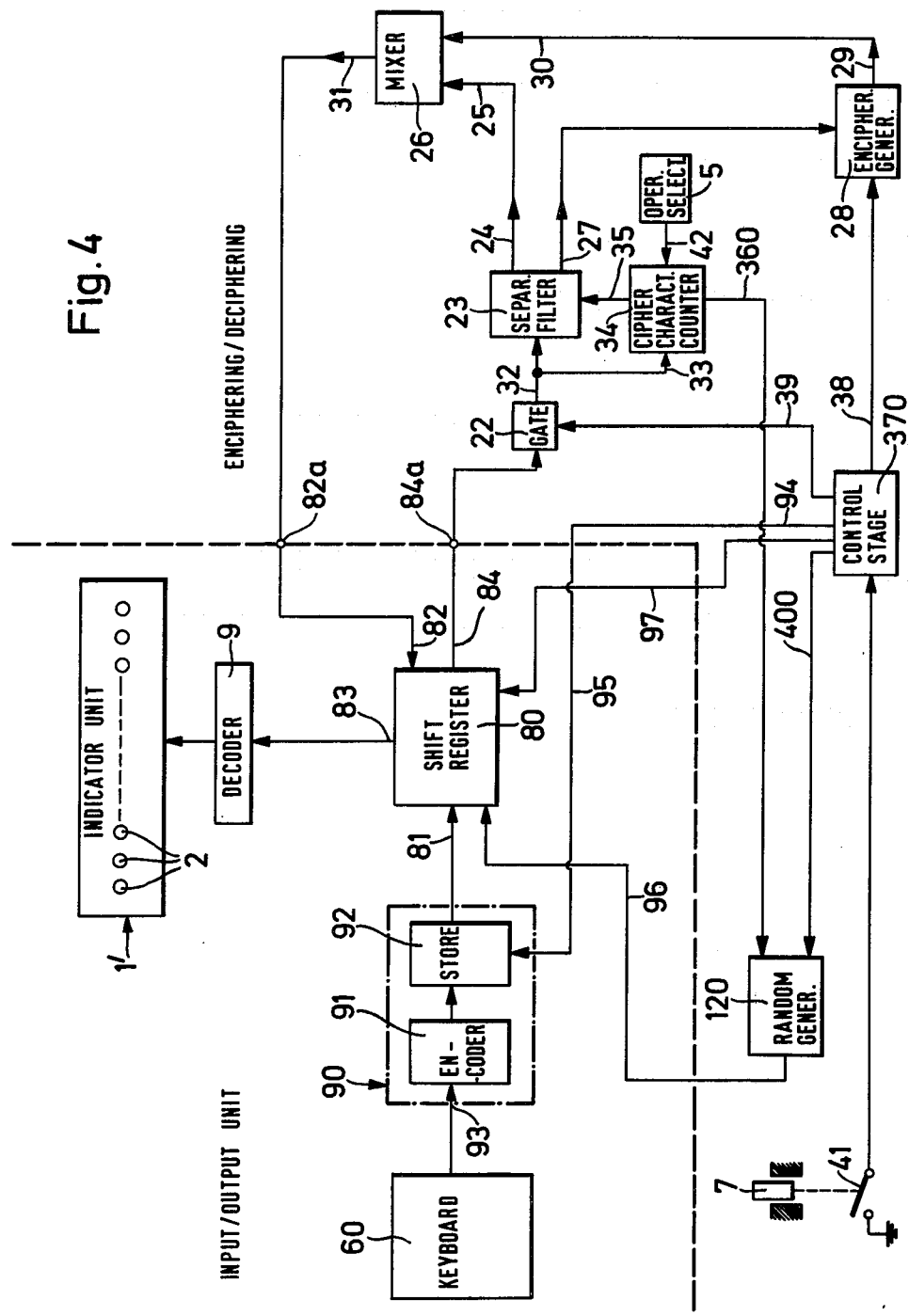

DATA INDICATOR UNIT

FIELD OF THE INVENTION

The invention relates to a data indicator unit hving character indicating sections arranged in accordance with a pattern, and an input keyboard for selectively actuating the indicating sections.

BRIEF REVIEW OF PRIOR ART

One of the main application of units of this kind is as enciphering/deciphering units and data transmission systems which may or may not be combined with enciphering units. In many of the input units known today, each character which is to be introduced has its own key on the input keyboard or a combination or two or more different keys. In view of the large number of characters conventionally used in telecommunications — there are of course generally 26 letters, 10 numbers and some 20 special characters for punctuation etc., — very large keyboards are necessary even if many of the character sections bear double characters. Apart from the expense of providing such large keyboards and attendant susceptibility to trouble, such keyboards frequently require considerable space and this has an adverse effect on the present-day trend to miniaturization. To produce the electrical signals associated with individual characters, such keyboards also require rather complicated encoding circuits.

OBJECT OF INVENTION

One of the main objects of the invention, therefore, is to provide a space-saving data indicator unit.

Another object of the invention is to provide a data indicator unit that requires the minimum amount of circuitry to produce electrical signals corresponding to the individual characters.

Another object of the invention is to provide a pocket-size combined indicator and enciphering and deciphering unit.

To this end, according to the invention, a switching unit is provided with a number of different possible switching states corresponding to the number of character sections for the purposes of selective control of the individual indicator means. A setting stage, controlled via a number of setting keys of an input keyboard, is connected in series with the switching unit for selectively setting the various switched states of the switching unit, the maximum number of setting keys is, preferably, ten.

A data indicator unit according to the invention makes it possible to construct small-format enciphering-/deciphering units.

SUMMARY OF INVENTION

According to the invention, a combined enciphering and deciphering unit is provided having character sections arranged in a pattern; indicator means, more particularly optical indicator means, associated with each individual character section; an electronic enciphering and deciphering stage whose outputs activate the indicator means; an input keyboard by means of which the indicator means can be selectively activated and the characters for processing can be introduced into the enciphering and deciphering stage; and a switching unit having a number of different possible switched states corresponding to the number of character sections for selective control of the individual indicator means. In each switched state the switching unit generates a signal associated with whichever indicator means has been activated, the setting keys of the input keyboard forming a decimal keyboard, a single-digit or two-digit decimal number which can be represented by means of this decimal keyboard is associated with each character section and the setting stage so sets the shift register that the latter controls precisely that one of the indicator means which is associated with the character section allocated to the particular decimal number.

LIST OF DRAWINGS

Embodiments of the invention will be explained in detail hereinafter with reference to the accompanying drawings wherein:

FIG. 4 is a block schematic of the circuitry of the unit shown in FIG. 3.

DETAILED DESCRIPTION OF PREFERRED EMBODIMENTS

Figure 1:
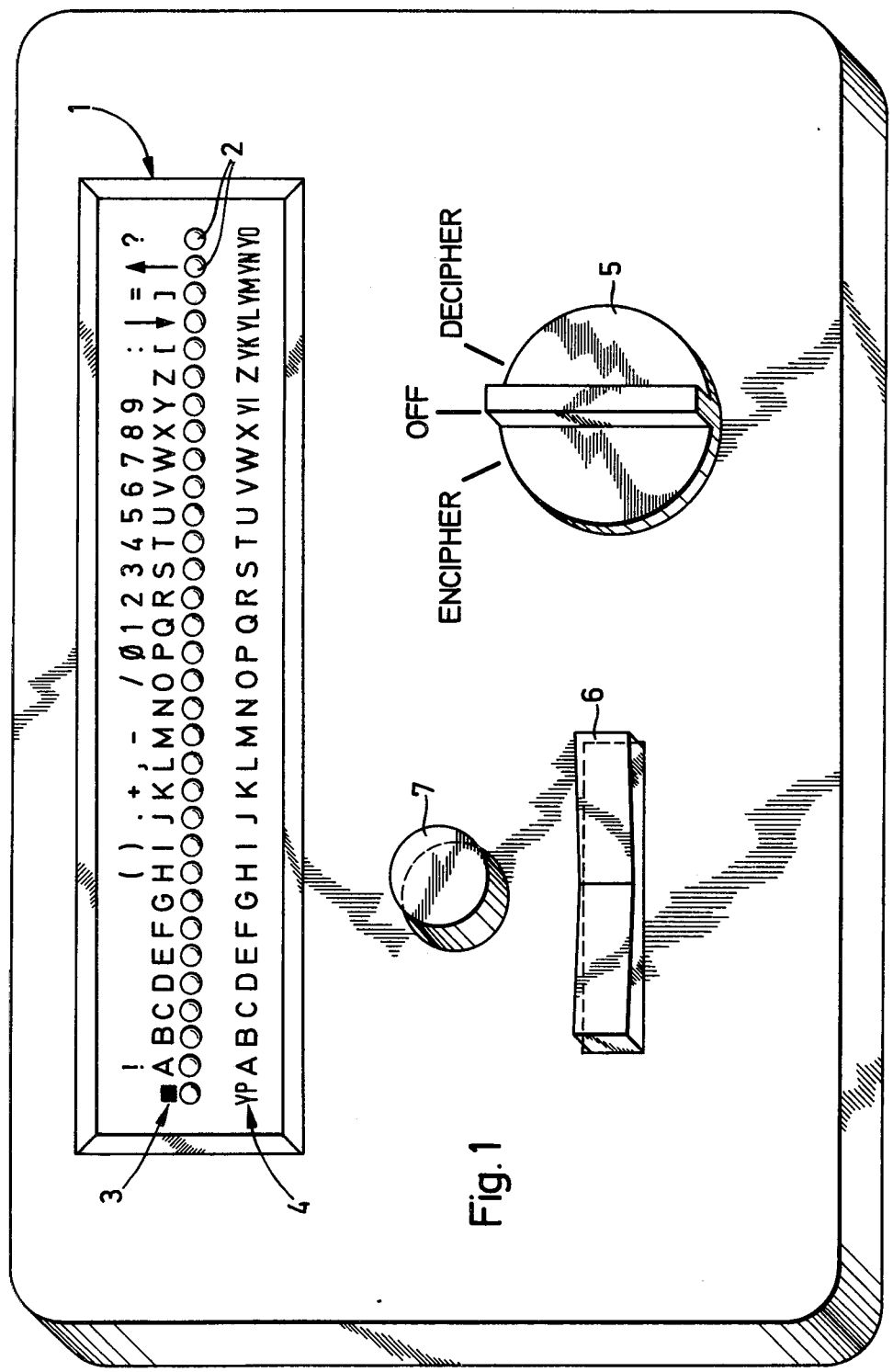
FIG. 1 shows a front elevation of a first embodiment of an enciphering/deciphering unit with a data input and indicator unit.

The pocket enciphering/deciphering unit shown in FIG. 1 comprises an indicator unit 1 which indicates the characters requiring to be introduced or which have already been introduced, and also the processed, i.e. enciphered or deciphered charcters. Indicator unit 1 consists of 32 luminous diodes 2 which are disposed in a straight line and on either side of which is a set of character sections 3, 4. Each two opposite character sections are associated with one diode. The top character section set 3 in the drawing contains the letters of the alphabet and the FIGS. 0 to 9 in natural sequence together with some additional characters customary in telecommunications. Some of the character sections bear double characters i.e., they either each carry one letter and one figure or a combination of a letter and some other character. The required distinction is made in a known manner by means of the changeover characters denoted symbolically by the arrow pointing up or down.

The bottom character set 4 comprises only a single line of characters and contain letters or combinations of two letters. All the characters of a set are disposed on a common support and are interchangeable so that the unit can very readily be adapted, for example, to different alphabets of different languages.

In addition to the indicator unit 1, the enciphering-/deciphering unit illustrated has only three other controls, an operation selector switch 5, an input rocker 6 and a release button 7, the latter two components forming an input keyboard. The unit can be set to encipher or decipher, or switched off, by means of the operation selector switch 5. The characters to be enciphered are introduced, and the appropriate processing operation is started, by means of the input keyboard 6, 7. The following is an explanation of how this happens with reference to the block schematic diagram illustrated in FIG. 2.

Figure 2:
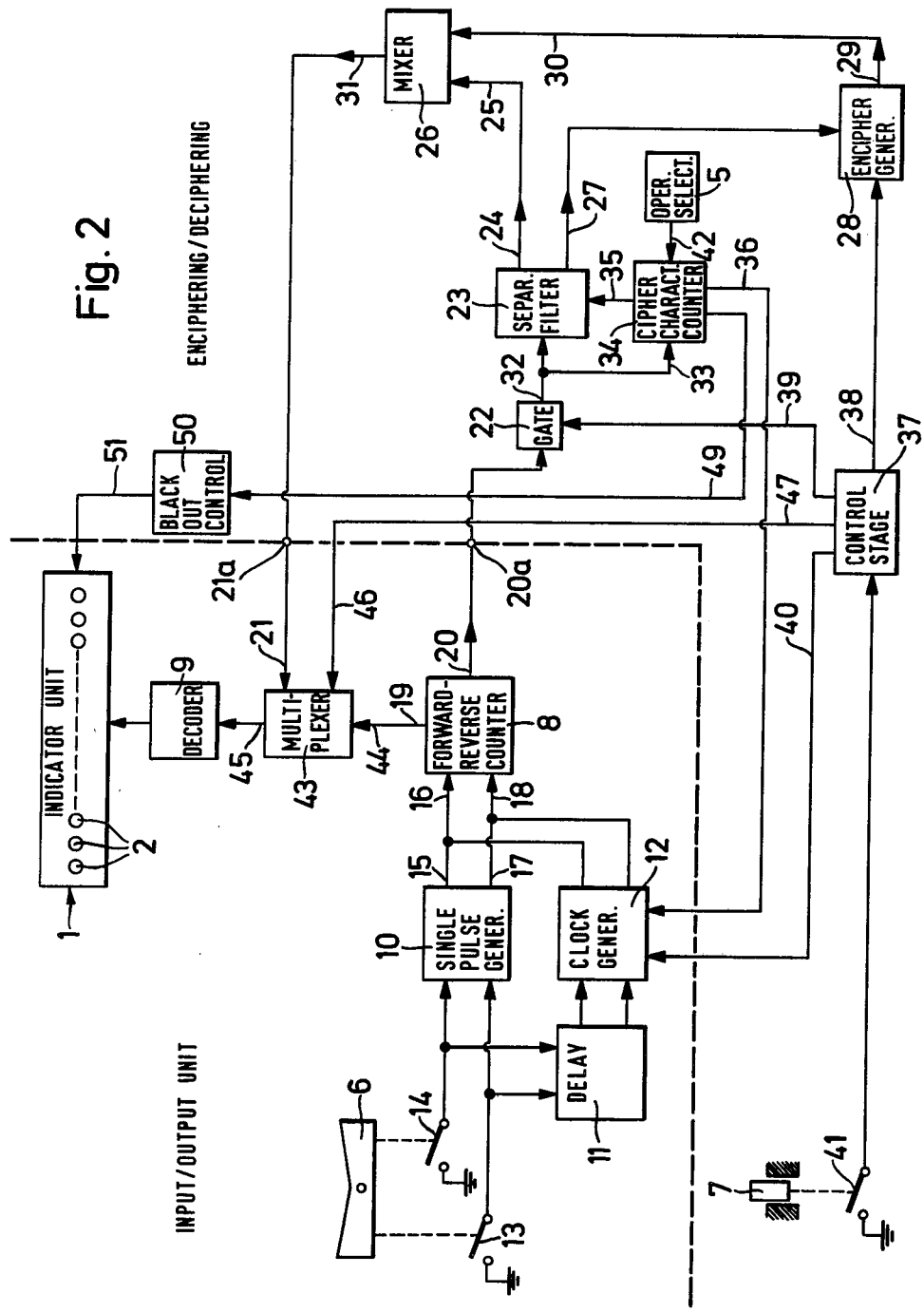
FIG. 2 is a block schematic of the circuitry of the unit shown in FIG. 1.

The part of the circuit on the left of the broken line in FIG. 2 comprises basically only the control circuitry for the indicator unit 1 and includes an electronic forward-reverse counter 8, a multiplex stage 43, a decoding circuit 9, a single pulse generator 10, a delay stage 11, a clock generator 12 and two pushbutton switches 13, 14 adapted to be operated by means of the rocker 6. When switch 14 is closed by means of rocker 6, a clock pulse forms at the output 15 of the single pulse generator 10 and advances the counter 8 by one step by way of its input 16. Similarly, actuation of switch 13 produces a clock pulse at output 17 of single pulse generator 10 to reverse the counter 8 one step by way of its input 18. The counter contents at any time pass via counter output 19 to the input 44 of the multiplex stage 43 and via the output 45 thereof to the decoding circuit 9, are decoded there and finally trigger the luminous diodes 2 of indicator unit 1. Multiplex stage 43 is connected via lead 46 to the output 47 of a control stage 37, which will be described hereinafter, and is so controlled by stage 37 that its output 45 is connected to its input 44 during the inputting of the characters for processing and during the actual processing, and to its second input 21 after processing of the characters is completed. The decoding circuit 9 is so designed that for any given counter state $n$ only the $n$th diode 2 lights up at any time. In this way, the counting sequence of counter 8 corresponds to the natural sequence of the alphabet, thus greatly facilitating operation of the enciphering-/deciphering unit. Of course this type of decoding is not the only one possible.

By a repeated actuation of the rocker 6 it is thus possible to set the counter 8 to any of its 32 possible states and thus trigger each of the 32 luminous diodes selectively. To simplify operation and accelerate the inputting operation, the clock generator 12 with the delay stage 11 is connected in parallel with the single pulse generator 10. If one of the two switches 13 or 14 is actuated for a longer period than the interval of time provided in the delay stage 11, the latter starts the clock generator 12 and, depending upon which of the two switches 13 or 14 has just been actuated, generator 12 delivers a continuous train of clock pulses to the forward/reversible counter 8 via one or other of the two inputs 16, 18 so that counter 8 is continuously advanced in one or other direction. The clock generator stops as soon as the relevant switch is no longer actuated.

Since a specific state of the counter is associated with each luminous diode, the counter contents, i.e. the electrical signal at its output, are characteristic of the character associated with whichever luminous diode is activated. The counter output signal thus represents this character in encoded form. Thus if one of the diodes 2 is activated by means of the rocker 6, a signal characteristic only of the character associated with the diode concerned will be present at output 19 and another output 20 of the counter. This signal can be sampled via output 20 and is then available for processing, e.g. transmission or, as in the present case, enciphering.

The indicator unit 1 is also suitable for indicating characters already present in the form of electrical signals. For this purpose, as already stated, multiplex stage 43 has another input 21. If electrical signals of the same kind as the output signals of counter 8 are fed to this input, the indicator unit diodes 2 will be illuminated accordingly. It is possible for these latter signals to be fed to the multiplex stage other than directly, e.g. by way of counter 8.

The part of the circuit shown on the right and below the broken line in FIG. 2 contains the components required for processing the signals at counter output 20. This part of the circuit is basically the same as the construction of known enciphering units of the kind described, for example, in Swiss Patent Specification No. 411,983. The signals for processing are fed via a gate circuit 22 to a separating filter 23 (demultiplexer circuit) and then, depending upon the setting of circuit 23, either via output 24 to one input 25 of a mixer stage 26, or via output 27 to an encipher generator 28, the output 29 of which is connected to the other input 30 of the mixer stage 26. The output 31 of the latter leads to input 21 of multiplex stage 43.

The output 32 of gate circuit 22 is connected to one input 33 of a cipher character counter 34. By way of leads 35, 36 and 49 counter 34 controls, respectively, filter 23, clock generator 12 and a black-out control stage 50 connected to the luminous diodes 2 of indicator unit 1 via lead 51. The second input 42 of cipher character counter 34 is connected to operation selector switch 5. Finally the four outputs 38, 39, 40 and 47 of the control stage 37 are connected to the enciphering generator 28, gate circuit 22, clock generator 12 and multiplex stage 43 respectively and which is itself triggered via a pushbutton switch 41 adapted to be actuated by release button 7. Actuation of switch 41 produces a pulse at the output 39 of control stage 37 to open gate circuit 22 so that the signal at its input, corresponding to the character introduced to the indicator unit 1, can be fed to filter 23 and cipher character counter 34.

Enciphering and deciphering of the signals are effected in known manner by modulo-2 mixing with the signals produced by the encipher generator 28. For this purpose the enciphering generator has to be brought to an accurately defined starting position by the introduction of a specific number of cipher characters — 20 in this case — before the enciphering or deciphering process starts. These cipher characters — which are signals associated with any of the characters of the indicator unit 1 — are as a rule divided into two groups, i.e. a basic cipher, which is fixed, and a random cipher which is formed afresh on each enciphering operation. The random cipher is generally produced by means of a random generator, and this is also the case with the unit described here.

To encipher a given sequence of characters, the operation selector switch 5 is first set to "encipher" so that filter 23 is automatically set so that the characters at its input are fed to the enciphering generator 28. Ten characters forming the basic cipher are then consecutively introduced in the indicator unit 1 and read into the enciphering generator 28 by actuation of the release button 7. The number of cipher characters read in is detected by the cipher character counter 34. As soon as the tenth character has been read in, counter 34 starts clock generator 12 via lead 36, and clock generator 12 cyclically advances the forward/reverse counter in very rapid sequence. Illumination of the diodes 2 is also suppressed as long as the clock generator 12 is in operation, by means of the black-out control stage 50 which is also triggered by the counter 34. If the release button 7 is then re-pressed, clock generator 12 is stopped by a stop signal produced by the control stage 37 and the signal corresponding to the forward/reverse counter state thus determined random fashion is read into the encipher generator 28 as a random cipher character and the associated cipher character is simultaneously indicated during the read-in operation. When read-in is complete, the clock generator — which together with the forward-reverse counter forms the random generator — is re-started and the entire process is now repeated until all the characters of the random cipher have been produced, indicated and read in. As soon as the last character has been read in, the cipher character counter 34 switches over the filter 23 so that the signals now introduced and forming the information for enciphering are fed to the mixer 26 where they are mixed with the output signals of the encipher generator 28, which has been advanced one step by the control stage 37 on each actuation of the release button 7, and are thus fed to the multiplex stage 43 and finally indicated as enciphered characters in the indicator unit 1. The multiplex circuit 43 triggered by the control stage 37 ensures that the plain-language character introduced and the encirphered character are not indicated simultaneously and that instead the indication of the plain-language character disappears as soon as the enciphered character is completely available.

For inputting the plain-language character, the usual procedure would be to take the top character section set as the guide, while the enciphered characters are advantageously read off from the bottom character section set. Although this is only a matter of convention, it has certain advantages for telegraphic communications with the characters selected as illustrated — the enciphered characters consist only of letters.

For deciphering, the operation selector switch 5 is set to "decipher," so that the filter 23 is again so switched that all the information at the filter is forwarded to the enciphering generator. The ten characters of the basic cipher are then introduced in the manner described. Unlike the enciphering operation, the ten characters of the random cipher must now also be read in in the same way as the basic cipher characters. In the "decipher" position of the operation selector switch, therefore, the cipher character counter 34 is therefore so switched that it does not start the clock generator 12. After the last cipher character has been read in, the filter 23 is again switched over and the unit is ready to decipher the characters then introduced. The enciphered characters may, for example, again be read off from the bottom character section set and the plain-language characters from the top character section set depending upon the system adopted.

The above-described construction of the input/indicator unit according to the invention has three quite significant advantages. Firstly, the input unit is space-saving both mechanically and electronically, and it is simple and hence substantially trouble-free. It also enables the characters introduced to be readily encoded into electrical signals and finally the clock generator which is in any case provided for rapid advance of the forward/reverse counter can be used together with the counter as a random generator to produce the random cipher characters. Another advantage is that the sets of characters can be easily interchanged unlike normal keyboards.

Figure 3:
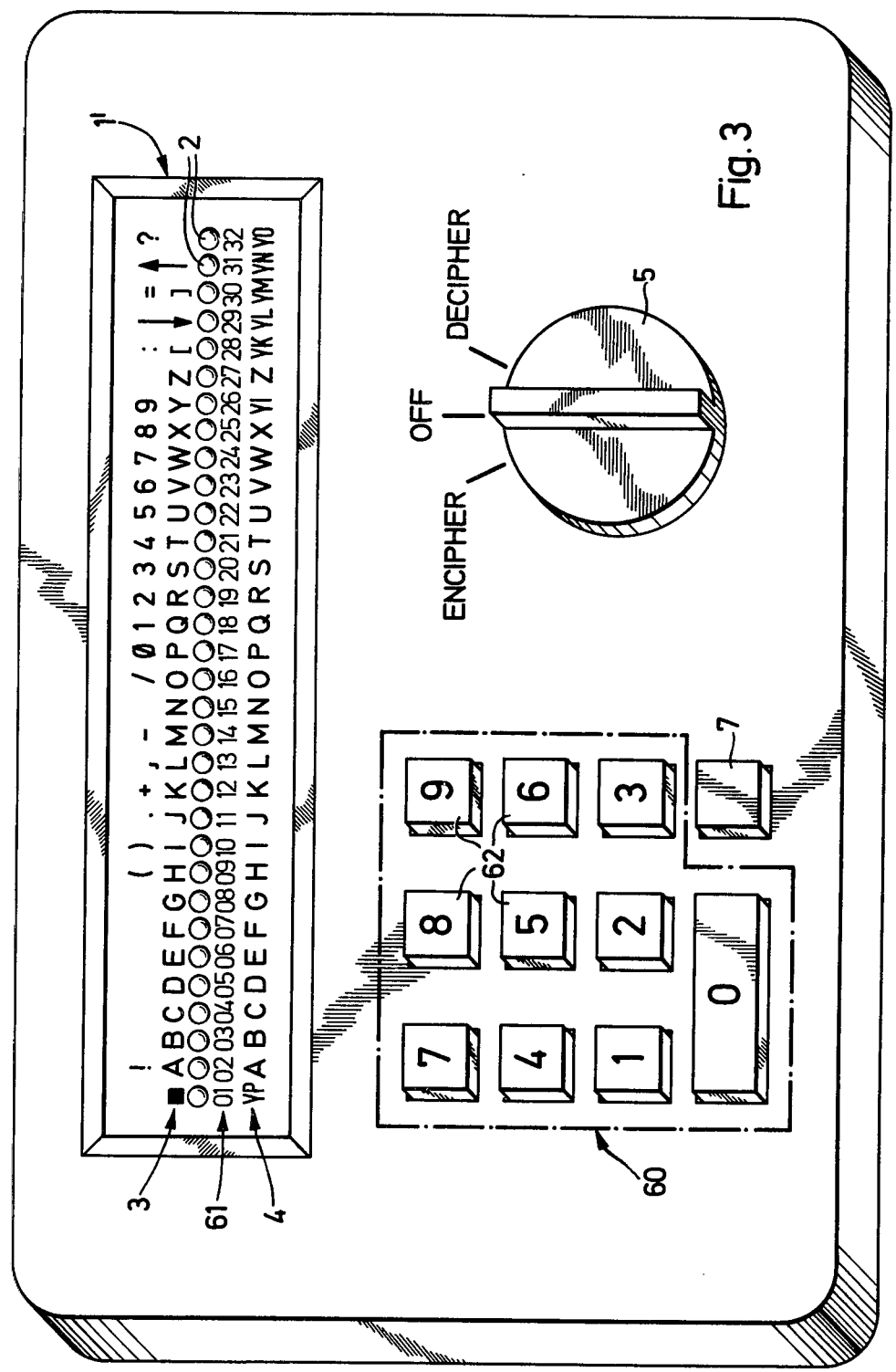
FIG. 3 is a second embodiment in front elevation.

In the following description of an alternative embodiment shown in FIGS. 3 and 4, the most striking difference from the first embodiment is that the rocker 6 is replaced by a decimal keyboard 60 and the luminous diodes 2 associated with the individual character sections are numbered consecutively with single-digit and two-digit decimal numbers 61. The electronic construction and operation of this embodiment will be apparent from the block schematic shown in FIG. 4. The units in FIG. 4 which are equivalent in function to those shown in FIG. 2 have been given like references.

Instead of the forward/reverse counter 8, then data input and indicator unit shown on the left of the broken line comprises a settable shift register 80 with inputs 81, 82 and outputs 83, 84. A setting stage having the general reference 90 and consisting of an encoding circuit 91 and a store 92 is connected in series with input 81 of shift register 80. The inputs 93 of the encoding circuit 91 are connected directly to the switches (not shown) of the ten setting keys 62 (FIG. 3) of the decimal keyboard 60.

To introduce a character, its associated number 61 is selected by passing two of the keys 62 of the decimal keyboard 60. The encoding circuit 91 converts the decimal-coded number into purely binary information which is then temporarily stored in the store 92. As soon as release button 7 is depressed, a control stage 370 similar to control stage 37 passes a control signal to store 92 via an output 94 and a lead 95, so that the binary information in the store 92 is read into the shift register 80 and the store is simultaneously erased. The shift register is now in a state clearly corresponding to the digit introduced and the associated character, and this state is decoded by the decoding circuit 9 connected to its output 83, and is finally indicated by illumination of the associated luminous diode 2.

The electrical equivalent of the character for enciphering is then introduced into the enciphering-disiphering stage in the same way by a control signal of control stage 370 fed to gate circuit 22 via lead 39 and a read control signal fed to the shift register 80 via lead 97, the procedure being similar to that in the first embodiment. The enciphered version is fed by input 82 to the shift register 80 and sets the latter to a corresponding state which is then again indicated by illumination of one of the diodes 2.

The enciphering stage (on the right of the broken line) in FIG. 4 is substantially the same as that in the first embodiment, the only exceptions being the provision of a random generator 120 for producing the supplementary character which in the first embodiment is produced by the clock generator 12 in association with the counter 8, and the absence of the black-out control stage 50.

The random generator 120 is connected to shift register 80 via lead 96 and is controlled in a similar manner to the clock generator 12 by the control circuit 370 via lead 400 and by the cipher character counter 34 by way of a lead 360. The random generator 120 forms a binary signal train being an analog version of the contents of store 92, said train being read into the shift register 80. The formation and reading in the basic and supplementary cipher characters into the encipher generator 28 are carried out in a similar manner to the first embodiment by actuation of the release button 7.

Although the above-described embodiment of the data input and indicator unit according to the invention requires a somewhat more complicated keyboard than the firat embodiment it is simpler to operate and allows a somewhat faster setting of the characters for ciphering or deciphering.

Whilst FIGS. 1 to 4 show embodiments of input/output units of the invention in connection with an enciphering/deciphering unit, the input/output unit can also be used in connection with any other data processing devices or as an autonomous unit. In the latter case separate data inputs and data outputs are provided as indicated by references 21a, 82a and 20a, 84a in FIGS. 2 and 4.

What is claimed is:

1. A combined data input/output unit for generating outgoing output data representing electrically encoded teletype characters and displaying incoming input data representing teletype characters, comprising
   a data input for input data to be displayed,
   a data output for generated output data,
   a display means includes indicator means and a support with a number of character fields, each character field having an individual indicator means associated therewith and having at least one teletype character thereon, the totality of the characters forming a substantially complete set of teletype characters,
   an input keyboard having not more than ten setting keys,
   a switching unit provided with a number of different possible switching states corresponding to the number of character fields of the support and having an output connected to said data output, said output data being constituted by said switching states,
   a decoding means responsive to the switching unit and selectively activating the individual indicator means in response to the switching states of the switching unit,
   a setting stage controlled via the setting keys of the input keyboard and connected in series with the switching unit and selectively setting the various switching states of the switching unit, and
   a means connected to said data input and to said indicator means and being responsive to incoming encoded teletype input data and selectively activating said indicator means in response to said input data.

2. The unit as in claim 1 wherein
   the switching unit is a forward/reverse counter,
   the setting stage comprises a single pulse generator which, when triggered, switches the counter by one step, a repeater stage which, when started, continuously switches the counter and a delay stage which, when triggered, prevents the repeater stage from switching the counter for a predetermined delay time; and
   the keyboard comprises two keys controlling the single pulse generator, the repeater stage, the delay stage and the counter so as to trigger the single pulse generator and thus to advance or reverse the counter by one step on each actuation of one or other of the two keys and so as to start the repeater stage and thus to continuously advance or reverse the counter when one or other of the two keys is actuated for a longer time period than said predetermined delay time and to stop the repeater stage as soon as the respective key is no longer actuated.

3. The unit as in claim 1 wherein
   the keyboard is a decimal keyboard producing signals representing decimal numbers,
   a single-digit or a two-digit decimal number is associated with each individual character field,
   the switching unit is a settable shift register,
   the setting stage is built to set the shift register in a different state in response to each individual one-digit or two-digit decimal number, and
   the decoding means is built to activate precisely that one of the indicator means which is associated with the character field allocated to the particular decimal number.

4. A unit according to claim 1, wherein the two keys are formed by a rocker.

5. A unit according to claim 1, wherein the indicator means are formed by a set of light-emitting diodes disposed substantially in a straight line, and two sets of character fields comprising different sets of characters are associated with them each on one side of the diode line.

6. A unit according to claim 5, wherein the set of character fields are interchangeable.

7. A unit according to claim 5, wherein one of the character sets contain letters and numbers in an alphabetical or natural sequence.

8. A combined enciphering/deciphering unit comprising
   a display means including indicator means and a support with number of character fields, each character field having an individual indicator means associated therewith and bearing at least one teletype character thereon, the totality of the characters forming a substantially complete set of teletype characters,
   an input keyboard,
   a switching unit provided with a number of different possible switching states corresponding to the number of character fields of the support and generating different output signals in each switching state,
   a decoding means responsive to the switching unit and selectively activating the individual indicator means in response to the switching states of the switching unit,
   a setting stage controlled via the input keyboard and connected in series with the switching unit and selectively setting the various switching states of the switching unit,
   an electronic enciphering/deciphering stage generating from signals introduced into it enciphered or deciphered signals at its output,
   mode selecting means for selecting the enciphering or the deciphering mode of the said enciphering/deciphering stage,
   a gate circuit controlled by said key board for introducing into the enciphering/deciphering stage the output signals of the switching unit,
   a means connected to the output of said enciphering/deciphering stage selectively activating said indicator means in response to the enciphered or deciphered output signals of the enciphering/deciphering stage, and
   control means controlling data transfer and processing between and within the several stages of the unit.

9. The unit as in claim 8 wherein
   the switching unit is a forward/reverse counter,
   the setting stage comprises a single pulse generator which, when triggered, switches the counter by one step, a repeater stage which, when started continuously switches the counter and a delay stage which, when triggered, prevents the repeater stage from switching the counter for a predetermined delay time; and
   the keyboard comprises two keys controlling the single pulse generator, the repeater stage, the delay stage and the counter so as to trigger the single pulse generator and thus to advance or reverse the counter by one step on each actuation of one or other of the two keys and so as to start the repeater stage and thus to continuously advance or reverse the counter when one or other of the two keys is actuated for a longer time period than said predetermined delay time and to stop the repeater stage as soon as the respective key is no longer actuated.

10. The unit as in claim 8 wherein the keyboard is a decimal keyboard producing signals representing decimal numbers, a single-digit or a two-digit decimal number is associated with each individual character field, the switching unit is a settable shift register, the setting stage is built to set the shift register in a different stage in response to each individual one-digit or two-digit decimal number, and the decoding means is built to activate precisely that one of the indicator means which is associated with the character field allocated to the particular decimal number.

11. The unit as in claim 9 wherein the enciphering-/deciphering stage comprises an encipher generator settable to a given starting state by a number of cipher characters, wherein the repeater stage and the forward-/reverse counter form a random generator controller by said control means and said input keyboard to produce said number of cipher characters, and wherein a black-out stage is provided which blocks actuation of said indicator means as long as the repeater stage and the counter act as random generator.

* * * * *